United States Patent [19]

Kawakubo et al.

[11] Patent Number: 4,590,599
[45] Date of Patent: May 20, 1986

[54] GAS LASER DEVICE

[75] Inventors: Yukio Kawakubo; Hiroyuki Sugawara; Kouji Kuwabara, all of Hitachi; Toshiharu Shirakura, Ibaraki; Satoshi Takemori; Kouji Sasaki, both of Hitachi, all of Japan

[73] Assignee: Hitachi, Ltd., Tokyo, Japan

[21] Appl. No.: 499,244

[22] Filed: May 31, 1983

[30] Foreign Application Priority Data

Jun. 2, 1982 [JP] Japan .................. 57-93211

[51] Int. Cl.⁴ .............................. H01S 3/097
[52] U.S. Cl. ...................... 372/87; 372/88
[58] Field of Search ............ 372/87, 88; 313/188, 313/189, 190, 192, 193, 195, 196, 197, 198, 217

[56] References Cited

U.S. PATENT DOCUMENTS 4,166,986 9/1979 Hundstad et al. .............. 372/87
4,255,720 3/1981 Wang et al. .................... 372/87
4,342,115 7/1982 Davis ............................ 372/87
4,470,144 9/1984 Sano et al. ..................... 372/87

Primary Examiner—Wiliam L. Sikes
Assistant Examiner—Robert E. Wise
Attorney, Agent, or Firm—Antonelli, Terry & Wands

[57] ABSTRACT

A gas laser device has an anode and a cathode arranged oppositely in a discharge tube. The cathode comprises a plurality of cathode members each having a predetermined discharge effective cathode surface and each being electrically isolated from others. A switching circuit selects the cathode member(s) used for a continuous wave oscillation and the cathode member(s) used for a pulsed oscillation. The total area of the discharge effective cathode surface(s) of the cathode member(s) used for the pulsed oscillation is selected to be smaller than, preferably ⅓ to ½ of that of the discharge effective cathode surface(s) of the cathode member(s) used for the continuous wave oscillation.

9 Claims, 10 Drawing Figures

GAS LASER DEVICE

The present invention relates to a gas laser device capable of operating in a continuous wave (CW) oscillation mode and a pulsed oscillation mode.

In general, a gas laser device has a gas medium such as $CO_2$ gas, $N_2$ gas or He gas sealed in a discharge tube. A glow discharge is formed between cathode and anode electrodes arranged in the discharge tube to excite the gas medium, thereby generating a laser beam. In a continuous wave mode, the laser beam is continuously irradiated to a workpiece, the workpiece is punched, cut or welded. When the continuous laser beam is irradiated to the workpiece to punch it, a long irradiation time is required. Therefore, by thermal affect such as wrinkles or fusing, small holes of a diameter of 0.1–0.2 mm, for example, cannot be formed or cutting width of a metal is broadened.

On the other hand, when the pulsed oscillation mode is used, the irradiation time of the laser beam to the workpiece is short and a laser peak output is large, and hence it is suitable to form the small holes or cut the metal with a narrow cutting width. As disclosed in Japanese Patent Application Laid-Open No. 56-42392 laid open on Apr. 20, 1981, in the pulsed oscillation mode, a D.C. voltage is applied to the cathode prior to the application of a pulse voltage. A high intensity light called a negative glow is emitted in front of the cathode. This usually occurs only partially. By applying the pulse voltage under this condition, a pulse current superimposes on a precharge current so that the negative glow is spreaded. The spread affects to a characteristic of the pulsed oscillation.

As shown in FIG. 4A, in the continuous wave oscillation mode, there exists a current threshold $I_{th}$ below which the oscillation does not occur. It is important from an application aspect to note that, in the pulsed oscillation mode, a small current $I_o$ in the predischarge state is set below the threshold $I_{th}$. When the glow discharge is effected at the small current $I_o$ with the cathode having a discharge effective surface set to an optimum value for continuous high output, only a portion of the cathode surface contributes to the discharge. This can be readily confirmed by the fact that the high intensity light in front of the cathode called the negative glow appears in an arc partially along the cathode surface, when a ring cathode is used. When the pulse voltage is applied under this condition to increase the glow discharge current, the glow discharge changes to an arc discharge at a relatively low current because the pulse current increases at a higher rate than the negative glow spreads over the entire cathode surface and a current density on the cathode surface increases rapidly. Therefore, a sufficient pulsed oscillation output is not produced. When a plurality of discharge tubes are arranged in parallel, distribution of the predischarge current $I_o$ to the respective discharge tubes is ununiform and hence, when the pulse voltage is applied, the glow discharge of the discharge tube which carries a smaller predischarge current first shifts to the arc discharge. As a result, a stable output is not produced.

It is an object of the present invention to provide a gas laser device capable of operating in both a continuous wave oscillation mode and a pulsed oscillation mode.

In the gas laser device according to the present invention, a plurality of cathode members each having a predetermined discharge effective cathode surface and each being electrically isolated from others are arranged opposite to an anode, and switching means selects cathode member(s) used for a continuous wave oscillation mode and cathode member(s) used for a pulsed oscillation mode. The total area of the discharge effective cathode surface(s) of the cathode member(s) used for the pulsed oscillation mode is selected to be smaller than that of the discharge effective cathode surface(s) of the cathode member(s) used for the continuous wave oscillation mode. With such an arrangement, when the pre-glow discharge voltage is applied to the pulsed oscillation cathode member(s) to flow the pre-glow discharge current, the discharge occurs on the entire area of the pulsed oscillation cathode member(s). Thus, when the pulse voltage is applied to the pulsed oscillation cathode member(s) under this condition, the pulse currents immediately flow from the entire area of the pulsed oscillation cathode member(s). Accordingly, the arc discharge does not occur in the pulsed oscillation mode and the output is stabilized. In addition, the single device can be operated in both the continuous wave oscillation mode and the pulsed oscillation mode.

Preferred embodiments of the present invention will now be described referring to the accompanying drawings, in which.

Figure 1:
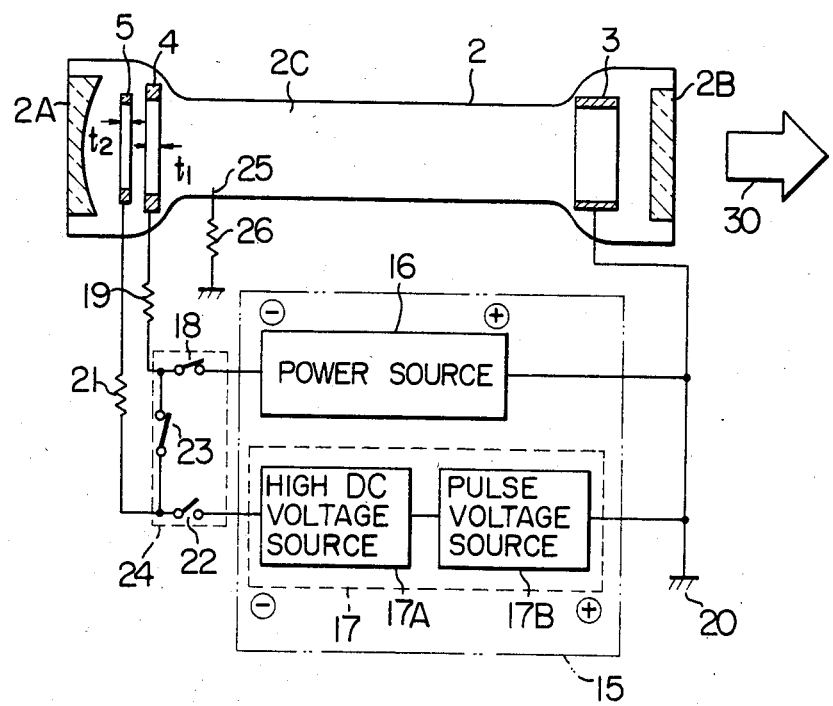
FIG. 1 shows a side sectional view of a gas laser device in accordance with one embodiment of the present invention.

Referring to FIG. 1 which shows a gas laser device in accordance with one embodiment of the present invention, the gas laser device has a cylindrical anode 3, a disc-shaped cathode member 4 for a continuous wave oscillation mode (hereinafter referred to as a first cathode) and a disc-shaped cathode member 5 (hereinafter referred to as a second cathode) for a pulsed oscillation mode arranged in a discharge tube 2 having a reflection mirror (total reflection mirror) 2A and a reflection mirror (output mirror) 2B at opposite ends. The thickness $t_1$ of the first cathode 4 is larger than that $t_2$ of the second cathode 5. The structures of the cathodes 4 and 5 are identical except the thickness. Therefore, the structure of the first electrode 4 is explained with reference to FIGS. 2 and 3. The first cathode 4 has an inner aperture 6, and a discharge effective cathode surface 8 is formed on an inner periphery facing the aperture 6. A plurality of gas flow paths 10 through which a gas medium 2C (see FIG. 1) flows are formed across the cathode surface 8 and an outer periphery 9. The gas medium 2C is circulated by a forced circulation system (not shown) which communicates with the discharge tube 2.

An insulated tube having one end thereof connected to a tube wall between the reflection mirror 2A of the discharge tube 2 and the second cathode 5 and the other end thereof connected to a tube wall between the anode 3 of the discharge tube 2 and the output mirror 2B is provided so that gas flow paths are formed together with the discharge tube 2. The insulated tube contains therein a blower for flowing the gas medium 2C in the discharge tube 2 from the cathode to the anode, and a heat exchanger for cooling the gas medium is arranged on a portion of the insulated tube near the anode 3. A high voltage source 15 is connected across the anode 3 and the first cathode 4 and the second cathode 5.

Figure 2:
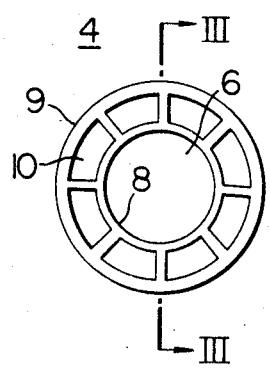
FIGS. 2 and 3 show a plan view and a side sectional view, respectively, of a cathode member used in the device of FIG. 1.
Figure 3:
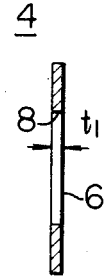

The cathode structure having the gas flow paths 10 shown in FIGS. 2 and 3 is disclosed in the Japanese Patent Application Laid-Open No. 55-30817 laid-open on Mar. 4, 1980. The cathode surface other than the cathode surface 8 facing the aperture 6 is coated with an insulative coating. In a ring-shaped cathode having no gas flow path 10, the glow discharge formed between the anode and the cathode is urged to the wall surface of the discharge tube 2 by the flow of the gas medium which is circulated at a high speed and a space having no glow is formed upstream of the discharge tube 2 close to the cathode. The gas flow paths 10 are provided to prevent such an inconvenience.

The high voltage source 15 comprises a D.C. power source 16 for the continuous wave oscillation and a pulse power source for the pulsed oscillation. A first stabilizing resistor 19 and a first switch 18 are connected between the D.C. power source 16 and the first cathode 4. The pulse power source 17 comprises a high D.C. voltage source 17A and a pulse voltage source 17B. The pulse voltage source 17B is connected to the anode 3 and a ground 20, and a second stabilizing resistor 21 and a second switch 22 are connected between the high D.C. voltage source 17A and the second cathode 5. A third switch 23 is inserted between the D.C. power source 16 and the pulse power source 17.

The operation of the gas laser device shown in FIG. 1 is now explained.

Figure 4A:
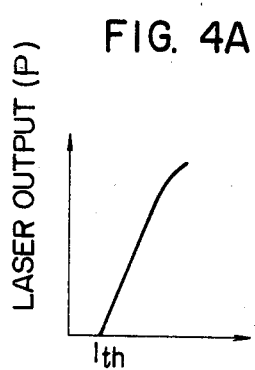
FIG. 4A shows a characteristic curve of a laser output P versus a glow discharge current $I_g$.
Figure 4B:
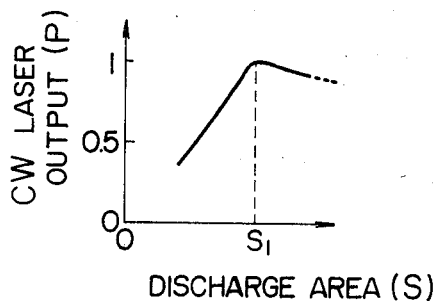
FIG. 4B shows a characteristic curve of a CW laser output P versus a discharge area S.

When the gas laser device is to be operated in the continuous wave oscillation mode, the second switch 22 is opened and the first and third switches 18 and 23 are closed to connect the D.C. power source 16 between the anode 3 and the first and second cathodes 4 and 5. Thus, the voltage is applied between the anode 3 and the first and second cathodes 4 and 5 so that a continuous glow discharge occurs between the anode 3 and the cathode surfaces 8 of the first and second cathodes. The discharge area (a sum of the cathode surface area of the first cathode 4 and the cathode surface area of the second cathode 5) is represented by $S_1$ as shown in FIG. 4B. The laser beam is reciprocally and repeatedly reflected between the reflection mirror 2A and the output mirror 2B in the laser medium 2C excited by the glow discharge, and a portion 30 of the laser beam is continuously outputted through the output mirror 2B. If only a small continuous output is required, only one of the first and second cathodes 4 and 5 may be used.

Figure 4C:
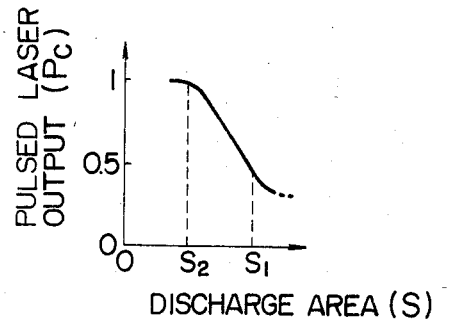
FIG. 4C shows a characteristic curve of a pulse laser output $P_c$ versus a cathode discharge area S.

In the pulsed oscillation mode, the second switch 22 of FIG. 1 is closed and the first and third switches 18 and 23 are opened to connect only the second cathode 5 to the pulse power source 17. Thus, by using only the second cathode 5, the discharge area (the cathode surface area of the second cathode 5) $S_2$ in the pulsed oscillation mode is selected to an area suitable to the pulsed oscillation which is smaller than the discharge area $S_1$ in the continuous wave oscillation mode. More particularly, the discharge area $S_2$ is determined in the following manner. In general, the output pulse width of the pulse laser required in the laser application is smaller than 1 ms. In order to attain such a fast response of the pulsed glow discharge, some predischarge is needed. In the present embodiment, the predischarge is effected by the glow discharge at a low current $I_o$ by the high D.C. voltage source 17A. Since a current density on the cathode surface when the glow discharge spreads over the entire cathode surface is constant for a given gas pressure, the negative glow spreads over the entire cathode surface even with a predischarge current lower than an oscillation threshold if the discharge area $S_2$ in the pulsed oscillation mode is sufficiently smaller than the discharge area $S_1$ in the continuous wave oscillation mode. Accordingly, as shown in FIG. 4C, a stable high power pulse laser beam is produced. In practice, the discharge area $S_2$ may be selected to $\frac{1}{3}$ to $\frac{1}{2}$ of the discharge area $S_1$ in the high power continuous wave oscillation mode. With the disc-shaped apertured electrode shown in FIGS. 2 and 3, the desired areas $S_1$ and $S_2$ can be readily obtained by adjusting the thickness $t_1$ of the first cathode 4 and the thickness $t_2$ of the second electrode 5 such that they meet a relation of $t_1 > t_2$. In an experiment mode by the inventors, a good result was obtained with the first and second cathodes 4 and 5 of an inner diameter of 65 mm, and $t_1 = 0.7$ mm and $t_2 = 0.3$ mm. For the cathodes of $t_1 = 0.7$ mm and $t_2 = 0.5$ mm, the uniformity of the spread of the negative glow on the cathode surface of the second cathode 5 in the predischarge was worse than that for the cathodes of $t_1 = 0.7$ mm and $t_2 = 0.3$ mm.

In FIG. 1, the inner diameter of the first cathode 4 closer to the anode 3 is slightly larger than the inner diameter of the second cathode 5 in order that the cathode 4 at the downstream side of the gas flow is prevented from being thermally damaged by a glow discharge from the cathode 5 at the upstream of the gas flow. When the inner diameter of the first cathode 4 is equal to or slightly larger than the inner diameter of the second cathode 5, the thickness $t_2$ may be practically selected to $\frac{1}{3}$ to $\frac{1}{2}$ of the thickness $t_1$.

In FIG. 1, numeral 25 denotes a trigger electrode for facilitating the discharge, and a resistor 26 is connected between the trigger electrode 25 and the ground.

In accordance with the embodiment of FIG. 1, a single gas laser device can produce a high continuous power output and a high pulse power output by merely switching the switching means 24 including the switches 18, 22 and 23. In an experiment by the inventors, a pulse peak output of as high as 13 kW was produced with an axial flow type (coaxial type) $CO_2$ gas laser device which produces a continuous output of 2.5 kW.

In the embodiment of FIG. 1, the first, second and third switches are arranged between the first and second power sources and the first and second stabilizing resistors, but it is apparent that the same effect is attained when a portion thereof is arranged between the first and second stabilizing resistors and the first and second cathodes.

While the thickness $t_1$ of the first cathode is larger than the thickness $t_2$ of the second cathode in the embodiment of FIG. 1, the both cathodes may be of the same thickness. In this case, the cathode thickness is selected to the thickness $t_2$ of the pulsed oscillation cathode 5 of FIG. 1.

Figure 5:
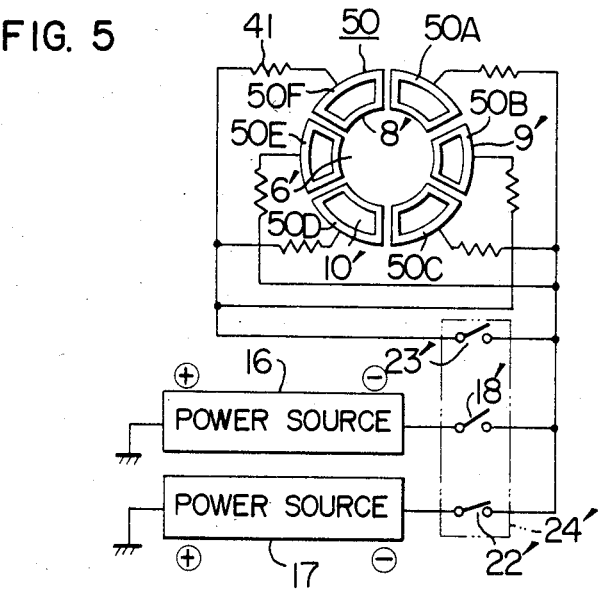
FIG. 5 shows major portions of another embodiment of the present invention.

FIG. 5 shows major portions of another embodiment of the present invention. In the present embodiment, a cathode 50 is of disc-shape having an aperture 6' as a whole and comprises a plurality of sector-shaped cathode members 50A-50F each inner periphery of which facing the aperture 6' forms a discharge effective cathode surface 8'. Each of the cathode members has a gas flow path 10' between the cathode surface 8' and an outer periphery 9'. The cathode members 50A-50F are electrically isolated from each other and the outer peripheries thereof are held by an insulating ring and supported in the discharge tube. The respective cathode members are connected to switching means comprising switches 18', 22' and 23' through a stabilizing resistor 41. In the continuous wave oscillation mode, the switch 22' is opened and the switches 18' and 23' are closed so that all the cathode members 50A-50F are connected to the continuous wave oscillation power source 16 and the glow discharge occurs on the cathode surfaces 8'. In the pulsed oscillation mode, the switches 18' and 23' are opened and the switch 22' is closed so that the cathode members 50A, 50C and 50E are connected to the pulsed oscillation power source 17 and the glow discharge occurs on the cathode surfaces 8'. Thus, the single cathode 50 can be used either for the continuous wave oscillation and for the pulsed oscillation.

The cathode members shown in FIGS. 2 and 5 have the gas flow paths 10 or 10', but the advantage of the present invention is equally attained with the disc-shaped or sector-shaped cathode members having no gas flow path.

In the above embodiments, the axial flow type (coaxial type) laser device having the disc-shaped or sector-shaped cathode was explained, but the present invention can also be applied to a cathode of other shape, to a three-axis orthogonal type device in which a gas flow direction, a discharge direction and a laser beam axis are orthogonal to each other, and to a two-axis orthogonal type device in which one of them is orthogonal to the other two directions.

Figure 6:
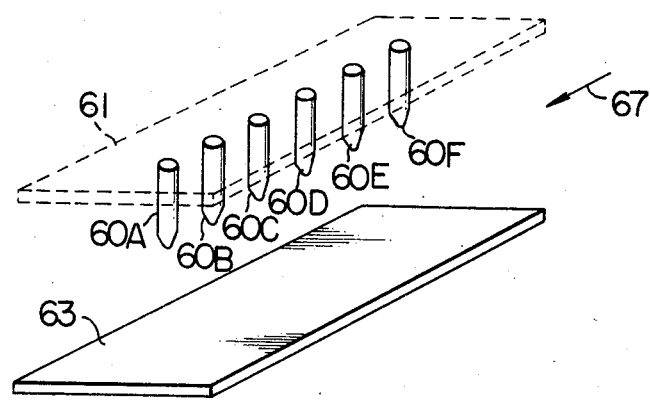
FIG. 6 shows major portions of a further embodiment of the present invention.

FIG. 6 shows major portions of a further embodiment of the present invention. Ends, which form discharge effective cathode surfaces, of a plurality of pin-shaped cathode members 60A-60F of the same dimension supported on an appropriate insulating member 61 are arranged to face a plate-like anode 63. The cathode members 60A-60F are connected to the power sources 16 and 17 through the switching means 24' in the same manner as the embodiment of FIG. 5.

Figure 7:
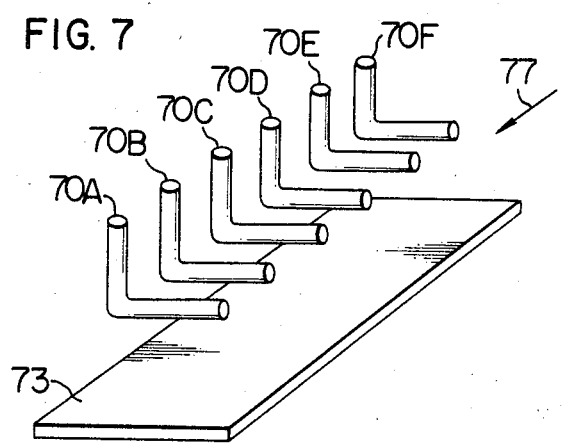
FIG. 7 shows major portions of a still further embodiment of the present invention.

FIG. 7 shows major portions of a still further embodiment of the present invention. Respective first sides, which form the discharge effective cathode surfaces, of a plurality of L-shaped cathode members 70A-70F of the same dimension supported on an appropriate insulating member (not shown) are arranged to face a plate-like anode 73. The cathode members 70A-70F are connected to the power sources 16 and 17 through the switching means 24' in the same manner as the embodiment of FIG. 5.

While six cathode members are shown in each of FIGS. 5, 6 and 7, the number of the cathode members may be any number larger than one.

Figure 8:
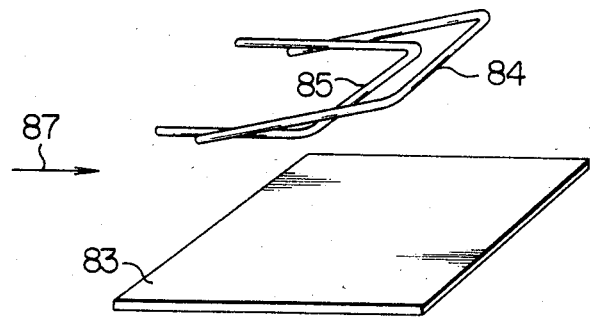
FIG. 8 shows major portions of a furthermore embodiment of the present invention.

FIG. 8 shows major portions of a furthermore embodiment of the present invention. Two U-shaped wire cathode members 84 and 85 are arranged to face a plate-like anode 83. The diameter of the cathode member 84 is larger than the diameter of the cathode member 85. The cathode members 84 and 85 are connected to the power sources 16 and 17 through the switching means 24 in the same manner as the cathode members 4 and 5 of FIG. 1.

Arrows 67, 77 and 87 shown in FIGS. 6, 7 and 8, respectively, show the directions of the gas flow. In FIG. 8, the cathode member 64 downstream of the gas flow is positioned higher than the upstream cathode member 85 in order that the downstream cathode member 84 is prevented from being thermally damaged by a glow discharge from the upstream cathode member 85. The arrangements shown in FIGS. 6, 7 and 8 can also be applied to the two-axis orthogonal type device and the three-axis orthogonal type device.

As described hereinabove, in accordance with the gas laser device of the present invention, the plurality of cathode members are arranged to face the anode and the total area of the discharge effective cathode surface(s) of the cathode member(s) used for the pulsed oscillation is selected to be smaller than that of the discharge effective cathode surface(s) of the cathode member(s) used for the continuous wave oscillation. Thus, the single gas laser device can produce the high continuous power output and the high pulse power output. Accordingly, a gas laser device having a wide application for heating can be provided.

What is claimed is:

1. A gas laser device comprising:
    a discharge tube having a gas medium sealed therein and having reflection mirrors at opposite ends thereof;
    a pair of anode means and cathode means arranged opposite to each other in said discharge tube between said reflection mirrors, said cathode means including a plurality of cathode members each of which has a predetermined discharge effective cathode surface and being electrically isolated from each other;
    D.C. power source means having one terminal thereof connected to said anode means;
    pulse power source means having one terminal thereof connected to said anode means; and
    switching means inserted between the other terminals of said D.C. and pulse power source means and said cathode means, said switching means connecting said D.C. power source means to at least one first selected cathode member of the plurality of cathode members of said cathode means in a continuous wave oscillation mode to cause a continuous glow discharge between said anode means and said at least one first selected cathode member while connecting said pulse power source means to at least one second selected cathode member of the plurality of cathode members of said cathode means in a pulsed oscillation mode to cause a pulsed glow discharge between said anode means and said at least one second selected cathode member, the total area of the discharge effective cathode surface of said at least one second selected cathode member being smaller than that of the discharge effective cathode surface of said at least one first selected cathode member.

2. A gas laser device according to claim 1, wherein the total area of the discharge effective cathode surface of said at least one second selected cathode member is ⅓ to ½ of that of the discharge effective cathode surface of at least one first selected cathode member.

3. A gas laser device according to claim 1, wherein said cathode means includes two disc-shaped cathode members each of which has an aperture and an inner periphery facing said aperture and forming said discharge effective cathode surface, the inner diameter of one of said two disc-shaped cathode members closer to said anode means is equal to or slightly larger than that of the other disc-shaped cathode member farther from said anode means, the thickness of the former disc-shaped cathode member is larger than that of the latter disc-shaped cathode member, and said switching means connects said D.C. power source means to at least the former disc-shaped cathode member in the continuous wave oscillation mode and connects said pulse power source means to the latter disc-shaped cathode member in the pulsed oscillation mode.

4. A gas laser device according to claim 1, wherein said cathode means includes two disc-shaped cathode members each of which has an aperture and an inner periphery facing said aperture and forming said discharge effective cathode surface, the inner diameter of one of said two cathode members closer to said anode means is equal to or slightly larger than that of the other cathode member farther from said anode means, the thickness of said two cathode members are equal to each other, and said switching means connects said D.C. power source means to both said two cathode members in the continuous wave oscillation mode and connects said pulse power source means to one of said two cathode members in the pulsed oscillation mode.

5. A gas laser device according to claim 1, wherein said cathode means includes a plurality of sector-shaped cathode members which is of ring shape having an aperture as a whole and each of which has an inner periphery facing said aperture and forming said discharge effective cathode surface, and said switching means connects said D.C. power source means to all said sector-shaped cathode members in the continuous wave oscillation mode and connects said pulse power source means to only at least one selected member of said sector-shaped cathode members in the pulsed oscillation mode.

6. A gas laser device according to claim 1, wherein said cathode means includes a plurality of pin-shaped cathode members each of which has one end thereof opposite to said anode means forming said discharge effective cathode surface, and said switching means connects said D.C. power source means to all said pin-shaped cathode members in the continuous wave oscillation mode and connects said pulse power source means to only at least one selected member of said pin-shaped cathode members in the pulsed oscillation mode.

7. A gas laser device according to claim 1, wherein said cathode means includes a plurality of L-shaped cathode members each of which has one side thereof opposite to said anode means forming said discharge effective cathode surface, and said switching means connects said D.C. power source means to all said L-shaped cathode members in the continuous wave oscillation mode and connects said pulse power source means to only at least one selected member of said L-shaped cathode member in the pulsed oscillation mode.

8. A gas laser device according to claim 1, wherein said cathode means includes two U-shaped cathode members made of wires of different diameters, and said switching means connects said D.C. power source means to at least the U-shaped cathode member of the larger diameter wire in the continuous wave oscillation mode and connects said pulse power source means to the U-shaped cathode member of the smaller diameter wire in the pulsed oscillation mode.

9. A gas laser device according to claim 1, wherein said pulse power source means includes a D.C. voltage source and a pulse voltage source.

* * * * *